(12) United States Patent
Goesmann et al.

(10) Patent No.: US 8,889,282 B2
(45) Date of Patent: Nov. 18, 2014

(54) APPARATUS FOR SUPPLYING POWER TO A MOTOR VEHICLE

(75) Inventors: Hubertus Goesmann, Nattheim-Auernheim (DE); Jens Vetter, Donzdorf (DE); Martin Mayr, Ilmmuenster (DE); Siegfried Pint, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1476 days.

(21) Appl. No.: 12/258,735

(22) Filed: Oct. 27, 2008

(65) Prior Publication Data

US 2009/0111009 A1  Apr. 30, 2009

Related U.S. Application Data

(60) Provisional application No. 60/991,889, filed on Dec. 3, 2007.

(30) Foreign Application Priority Data

Oct. 27, 2007 (DE) .......................... 10 2007 051 450

(51) Int. Cl.
*H01M 6/00* (2006.01)
*H01M 10/6569* (2014.01)
(Continued)

(52) U.S. Cl.
CPC ...... *H01M 10/5004* (2013.01); *H01M 10/5079* (2013.01); *H01G 9/26* (2013.01); *H01M*
(Continued)

(58) Field of Classification Search
CPC . H01M 2/0267; H01M 2/029; H01M 2/1088; H01M 2/20; H01M 2/202; H01M 2/208; H01M 2/22; H01M 2/30; H01M 2/348; H01M 6/50; H01M 6/5038; H01M 8/04007; H01M 8/04067; H01M 8/04074; H01M 10/50; H01M 10/5004; H01M 10/502; H01M 10/504; H01M 10/5051; H01M 10/5053; H01M 10/5055; H01M 10/5057; H01M 10/5059
USPC .................. 429/61, 62, 71, 72, 92, 120, 121; 439/754; 361/274.1, 328, 514
See application file for complete search history.

(56) References Cited

U.S. PATENT DOCUMENTS 4,937,705 A * 6/1990 Piber .............................. 361/710
5,122,427 A * 6/1992 Flowers et al. ................. 429/97
(Continued)

FOREIGN PATENT DOCUMENTS

DE  10003740 C1 * 6/2001 ............ H01M 10/50
JP  08148187 A * 6/1996 ............ H01M 10/50
(Continued)

*Primary Examiner* — Ula C Ruddock
*Assistant Examiner* — Amanda Barrow
(74) *Attorney, Agent, or Firm* — Crowell & Moring LLP

(57) ABSTRACT

An apparatus for supplying power to a motor vehicle, in particular a passenger vehicle or motorcycle, has a plurality of electrochemical storage cells. At least one of the electrodes respectively situated in the storage cells is made of metal or is provided with a metal layer essentially over its entire surface. The metal electrode or the metal layer, in particular a metal foil, is connected in an electrically conductive manner via a connecting element to a terminal provided outside the storage cell. To provide a reliable apparatus for supplying power, in particular for the intermittent electric motor drive of a motor vehicle, a thermally conductive cooling plate, which is in thermal contact with essentially each of the terminals of the storage cells, is provided. The cooling plate dissipates the thermal energy which is supplied by the metal electrodes or the metal layers on the electrodes to the terminal via the connecting element.

19 Claims, 2 Drawing Sheets

(51) Int. Cl.

| | | |
|---|---|---|
| *H01G 9/26* | (2006.01) | |
| *H01M 10/643* | (2014.01) | |
| *H01G 9/00* | (2006.01) | |
| *H01M 10/625* | (2014.01) | |
| *H01M 10/6572* | (2014.01) | |
| *H01M 10/6557* | (2014.01) | |
| *H01M 10/656* | (2014.01) | |
| *H01G 11/82* | (2013.01) | |
| *H01M 10/6553* | (2014.01) | |
| *H01G 2/08* | (2006.01) | |
| *H01G 11/10* | (2013.01) | |
| *H01M 10/613* | (2014.01) | |
| *H01M 10/653* | (2014.01) | |
| *H01M 10/34* | (2006.01) | |
| *H01M 10/052* | (2010.01) | |
| *H01M 10/6556* | (2014.01) | |

(52) U.S. Cl.
CPC .... *10/503* (2013.01); *H01M 10/345* (2013.01); *H01M 10/052* (2013.01); *H01G 9/0003* (2013.01); *Y02E 60/12* (2013.01); *H01M 10/5016* (2013.01); *H01M 10/5085* (2013.01); *H01M 10/5059* (2013.01); *H01M 10/5061* (2013.01); *H01G 11/82* (2013.01); *Y02E 60/13* (2013.01); *H01M 10/5051* (2013.01); *H01G 2/08* (2013.01); *H01G 11/10* (2013.01); *H01M 10/504* (2013.01); *H01M 10/5057* (2013.01)

USPC ............... 429/120; 429/61; 429/62; 429/71; 429/72; 429/92; 429/121; 439/754; 361/274.1; 361/328; 361/514

(56) References Cited

U.S. PATENT DOCUMENTS

| | | | |
|---|---|---|---|
| 5,684,683 A * | 11/1997 | Divan et al. | 363/65 |
| 7,646,612 B2 * | 1/2010 | Duarte et al. | 361/799 |
| 2002/0025473 A1 * | 2/2002 | Peterson | 429/157 |
| 2003/0017384 A1 * | 1/2003 | Marukawa et al. | 429/120 |
| 2003/0082438 A1 * | 5/2003 | Kwon | 429/120 |
| 2003/0106638 A1 * | 6/2003 | Kuriyama et al. | 156/278 |
| 2004/0043287 A1 * | 3/2004 | Bando et al. | 429/156 |
| 2005/0250006 A1 * | 11/2005 | Kim | 429/160 |
| 2006/0019155 A1 * | 1/2006 | Seman et al. | 429/159 |
| 2006/0216582 A1 * | 9/2006 | Lee et al. | 429/120 |
| 2007/0178372 A1 * | 8/2007 | Sakakibara | 429/120 |
| 2008/0124597 A1 * | 5/2008 | Murata et al. | 429/26 |

FOREIGN PATENT DOCUMENTS

| | | | | |
|---|---|---|---|---|
| JP | 11354166 A | * | 12/1999 | ............ H01M 10/50 |
| JP | 2002056904 A | * | 2/2002 | ............ H01M 10/50 |
| JP | 2003163036 A | * | 6/2003 | ............ H01M 10/50 |
| WO | WO 2007053993 A1 | * | 5/2007 | |

* cited by examiner

APPARATUS FOR SUPPLYING POWER TO A MOTOR VEHICLE

CROSS-REFERENCE TO RELATED APPLICATIONS

This application claims the benefit of priority under 35 U.S.C. §119(e) to U.S. Provisional Application No. 60/991,889, filed Dec. 3, 2007, and claims the benefit of priority under 35 U.S.C. §119(a) to German Application No. 10 2007 051 450.8, filed Oct. 27, 2007, the entire disclosures of these applications are herein expressly incorporated by reference.

BACKGROUND AND SUMMARY OF THE INVENTION

The invention relates to an apparatus for supplying power to a motor vehicle, in particular a passenger vehicle or motorcycle. The apparatus has a plurality of electrochemical storage cells and/or double-layer capacitors.

Known electrochemical storage cells are cooled from the exterior, i.e., their jackets are cooled. This is complicated, and sufficient cooling cannot always be reliably ensured. As a result, defects suddenly occur, which are not economically compatible with the service life requirements in automobiles.

The object of the invention is to provide a reliable apparatus for supplying power, in particular for the intermittent electric motor drive of a motor vehicle (hybrid vehicle).

This object is achieved by an apparatus for supplying power to a motor vehicle, in particular a passenger vehicle or motorcycle, the apparatus having a plurality of electrochemical storage cells and/or double-layer capacitors. At least one of the electrodes respectively situated in the storage cells and/or double-layer capacitors is made of metal or is provided with a metal layer essentially over its entire surface. The metal electrode or the metal layer, in particular a metal foil, is connected in an electrically conductive manner via a connecting element to a terminal provided outside the storage cell or outside the double-layer capacitor. A thermally conductive cooling plate is in thermal contact with essentially each of the terminals of the storage cells or double-layer capacitors. The cooling plate dissipates the thermal energy, which is supplied by the metal electrodes or the metal layers on the electrodes, to the terminal via the connecting element. Advantageous embodiments of the invention are described herein.

The invention provides for the refinement of a known apparatus for supplying power to a motor vehicle, in particular a passenger vehicle or motorcycle, the apparatus having a plurality of electrochemical storage cells and/or double-layer capacitors, wherein at least one of the electrodes respectively situated in the storage cells is made of metal or is provided with a metal layer essentially over its entire surface. The metal electrode or the metal layer, in particular a metal foil, is connected in an electrically conductive manner via a connecting element to a terminal provided outside the storage cell or outside the double-layer capacitor.

According to the invention, a thermally conductive cooling plate, which is in thermal contact with a plurality of the terminals of the storage cells or the double-layer capacitors, dissipates the thermal energy which is supplied by the metal electrodes or the metal layers on the electrodes to the terminal via the connecting element. Instead of cooling at all the terminals, it is also possible, for example, to perform one-sided cooling of the storage cells at the terminals, on the affected side of the storage cells or double-layer capacitors, whereby the terminals on the opposite side remain uncooled if this is sufficient.

In this manner, the heat may advantageously be reliably dissipated directly at the site of origin, even for use in an automobile. The design complexity is relatively low, and the apparatus according to the invention is characterized by a long service life.

The electrochemical storage cells are, preferably, lithium-ion batteries or barium titanate capacitors, which are characterized by high storage capacity and low volume.

The invention provides for the use of electrochemical storage cells, double-layer capacitors, or a combination thereof. The storage cells or double-layer capacitors in each case have a circular, prismatic, rectangular or square, oval, or flattened oval cross section, or have a flat-cell design in the form of a "coffee bag." Depending on the requirements, modules may be produced from storage cells or double-layer capacitors which have a high packing density without cavities, or which have fairly large cavities between the storage cells or double-layer capacitors. The modules may be, for example, actively cooled using a cooling medium which is passed through, or for passive cooling, cooled by means of thermal convection.

In one embodiment of the invention, the cooling plate contains a thermally conductive material, in particular metal. An electrically insulating, thermally conductive layer is provided between the cooling plate and the terminals. In this manner, satisfactory cooling may be achieved without the risk of short circuits.

In one refinement of the invention, the thermally conductive layer is formed from one or more superposed heat-conducting foils composed in particular of polyimide or thin PTFE. It is preferred to use one or more foils having an overall thickness of preferably 0.05 mm. When two or more superposed heat-conducting foils are used, the possibility that even a locally limited material defect in any of the heat-conducting foils is located directly above the other material defect may be excluded with a high degree of certainty. In this manner, electrical short circuits resulting from material defects, which can never be excluded, may be effectively prevented.

In one embodiment of the invention, the first side of the heat-conducting foil is fixed to the terminals, preferably by gluing. The second side has a slide coating, in particular a PVDF or PTFE coating. On the one hand, the position of the heat-conducting foil is spatially fixed, and on the other hand the heat-conducting foil is able to slide over the thermal contact surface for the cooling plate, so that the heat-conducting foil is not damaged, even when there are vibrations or relative motions between the storage cell or double-layer capacitor and the cooling plate. In this manner, the reliability of the apparatus according to the invention is further increased, and short circuits are effectively avoided.

In one refinement of the invention a heat-conducting foil, which is plastically or elastically deformable under pressure, is provided between the terminals of the storage cells and the cooling plate. According to the invention, such a heat-conducting foil is preferably electrically insulating, and preferably compensates for production tolerances in the distance; i.e., the heat-conducting foil fills gaps. In this manner good thermal contact is achieved, even for customary production tolerances and in the presence of vibrations. Such a heat-conducting foil preferably contains ceramic, silicone, wax, or a mixture of various thermally conductive substrates, and may have multilayer coatings.

In one embodiment of the invention the cooling plate is provided with a plurality of thermally conductive spring elements. Each of the spring elements thermally contacts a terminal of the storage cells via the thermally conductive layer. The heat at the cooling plate is dissipated via the spring elements. This measure allows good thermal contact even for customary production tolerances, which result in variation of the distance between the storage cell and the cooling plate. Interruption of the thermally conductive connection as the result of vibrations is likewise effectively prevented.

In one refinement of the invention, the cooling plate has cooling channels through or around which a heat-dissipating medium, in particular a refrigerant such as R 134a or carbon dioxide R 744, water, or air, flows. In this manner, the heat dissipation may consistently and reliably be ensured to a sufficient degree, even during intermittent peak loads on the storage cell.

In one embodiment of the invention multiple cooling plates are consecutively positioned at a distance from one another. Multiple storage cells or double-layer capacitors are provided between the covers of every two adjacent cooling plates. In this manner, a compact design is achieved.

In one embodiment of the invention, the storage cells or double-layer capacitors between two adjacent cooling plates are provided in the form of multiple modules of storage cells connected in series, in each case the maximum contact voltage of the modules being less than 60 volts.

In one refinement of the invention a housing cover is provided. The housing cover has electrical connectors which connect the modules between the two adjacent cooling plates in series when the modules are covered by the housing cover and which interrupt the series connection when the housing cover is removed.

The above measures prevent contact by a hazardous contact voltage without reducing the compactness of the apparatus according to the invention.

In one embodiment of the invention, at least some of the lateral surfaces of the cooling plates are brought into essentially perpendicular contact with a first and a second cooling wall, which extends over multiple consecutively positioned storage cells or double-layer capacitors. The storage cells or double-layer capacitors are situated between the first and the second cooling wall. In this manner, the storage cells or double-layer capacitors are housed compactly with good mechanical protection.

In one embodiment of the invention, the first or the second cooling wall is provided with cooling channels, which are connected to the cooling channels in the cooling plates. In this manner, a high degree of heat dissipation is achieved with compact dimensions of the apparatus according to the invention.

In one embodiment of the invention, the connecting elements for the storage cells or double-layer capacitors are electrically connected to one another via electrical connectors such that the storage cells or double-layer capacitors are connected in series. The electrical connectors are preferably dimensioned so that they greatly increase the thermal contact surface with the thermally conductive layer in comparison to the connecting elements alone. The connectors are preferably strips, cables, or flexible leads, which are welded or soldered to the connecting elements. Heat dissipation may be improved considerably by use of these structural measures, which have a simple design and are economically implemented.

In one exemplary embodiment of the invention, printed circuit boards containing printed conductors are provided between the electrical connectors. The printed conductors electrically contact the connecting elements of each storage cell, and tap the voltage present at each of the storage cells or double-layer capacitors, the current flow, or another characteristic parameter of the storage cell such as electric capacity or capacitance. To increase the service life, the characteristic parameter or voltage is supplied to a control device, which balances or compensates for the energy content of the storage cells or double-layer capacitors relative to one another.

In one embodiment of the invention the storage cells or double-layer capacitors, the cooling plates, and optionally the cooling walls are enclosed by thermal insulation. In one embodiment of the invention, one or more of the cooling plates and/or the cooling walls are provided with an air conditioner device, preferably electrically operated, which dissipates the thermal energy and preferably operates according to the evaporative or Peltier process.

In this manner, the apparatus according to the invention may be reliably cooled with little expenditure of effort, uninfluenced by the surrounding temperature at the specific location in the vehicle where the apparatus according to the invention is provided.

The invention is explained below with reference to drawings, which are not necessarily to scale. Identical or functionally equivalent parts are designated by the same reference numerals.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
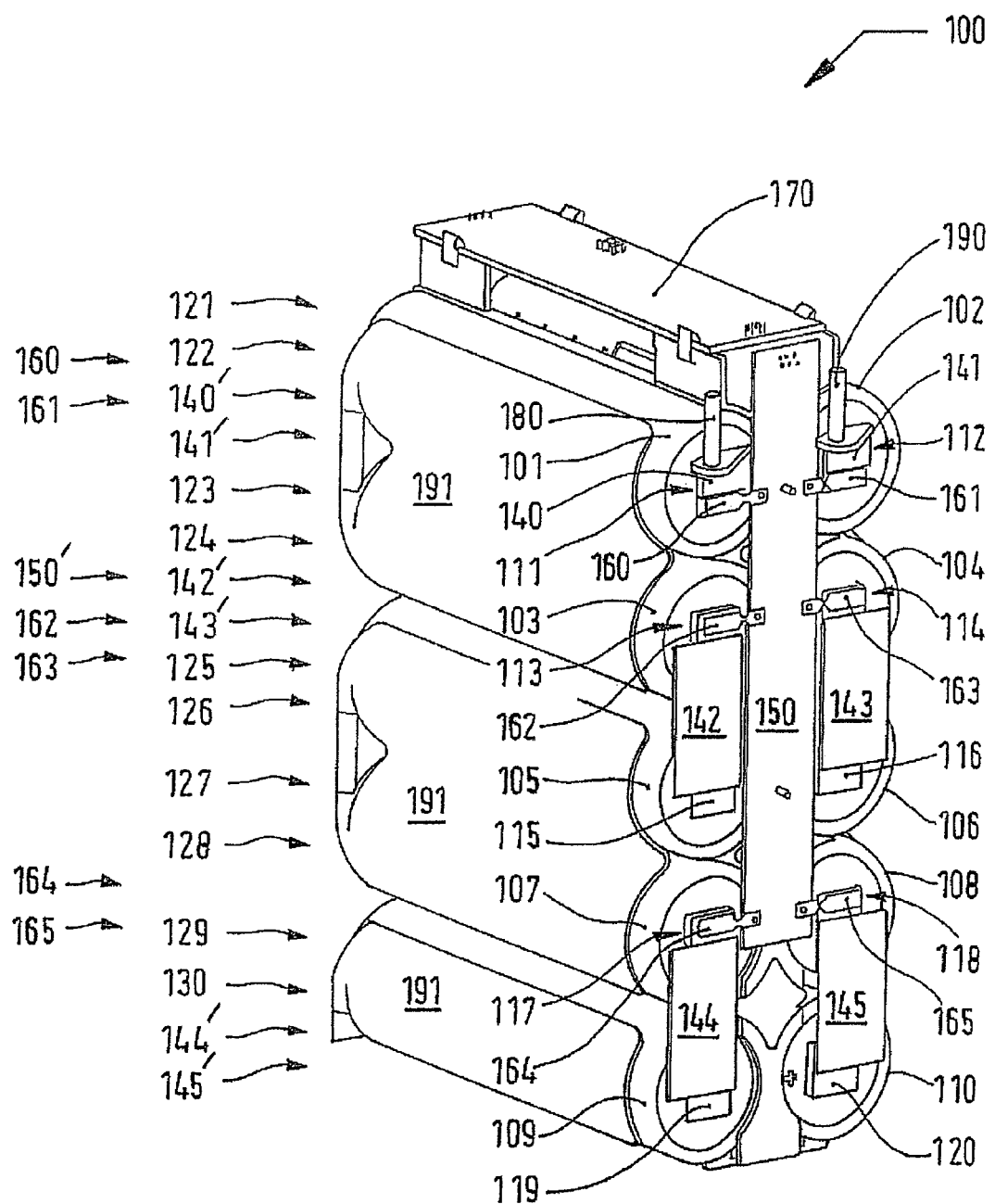
FIG. 1 shows a storage cell module having a plurality of storage cells.

The storage cell module 100 has storage cells 101 through 110, which in the present exemplary embodiment are arranged in two rows of five stacked storage cells each. Each of the known storage cells has at least one electrode (not illustrated) in the storage cell which is made of metal or is provided with a metal layer essentially over its entire surface (not illustrated). The interior connecting element (not illustrated) for the electrode is electrically connected to a terminal 111 through 120 provided on the front side outside of the storage cell, and is electrically connected to a terminal 121 through 130 provided on the back side outside of the storage cell. The terminal is preferably a contact surface in the form of a base, such as that for a battery pole, which is contacted by a contact spring. It is understood that the battery terminal may also have a different shape. According to the invention, the heat generated in the storage cell is dissipated via the associated electrodes, connecting elements, and terminals as described below.

The terminals of the storage cells are connected via electrical connectors 140 through 145 to the front side of the terminals, and via electrical connectors 140' through 145' to the back side of the terminals, in such a way that the ten storage cells are connected in series and the total voltage is applied to terminal posts 180 and 190. In the illustrated exemplary embodiment, the electrical connectors are strips, which are welded to the poles of the terminals. The heat generated in the storage cells may be reliably and adequately dissipated via the strips, which have a much larger surface area compared to the poles. It is understood that the connectors may also have another design if this is more practical and/or economical for the specific application of the apparatus according to the invention.

In the region of the electrical connectors, printed conductors or contact tabs 160 through 165 are provided, which contact the corresponding poles of the storage cells and supply the tapped voltage or another electrical variable for the particular storage cell via printed conductors (not illustrated), provided on printed circuit boards 150, to an electronic control device 170 for balancing the voltage in the storage cells in a known manner. A first printed circuit board 150 is provided on the front side between the two rows of storage cells, and a second printed circuit board 150' is provided on the back side between the two rows of storage cells. The control device 170 is provided above the two rows of storage cells.

To improve the dissipation of heat from the storage cells, the storage cells are preferably enclosed by a metal jacket 191, which partially surrounds preferably every two superposed storage cells. Each metal jacket is in thermal and electrical contact with a single connector, which connects the poles for the particular storage cells in series.

Figure 2:
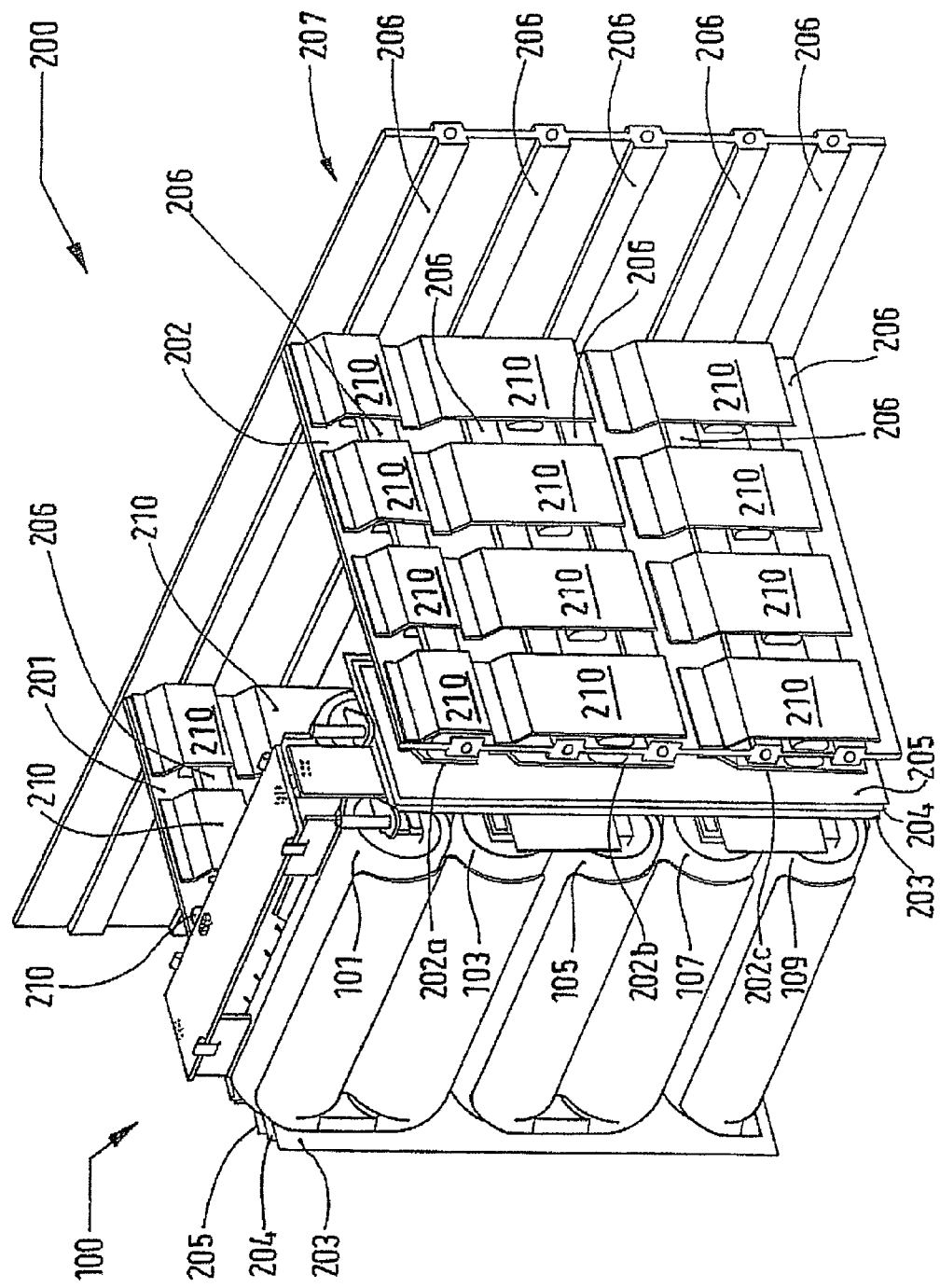
FIG. 2 shows an apparatus for providing power, having a storage cell module according to FIG. 1, and having cooling plates which dissipate the heat, conducted by the poles of the storage cells, via electrically insulating heat-conducting foils.

FIG. 2 shows important elements of the apparatus 200 for supplying power, having a storage cell module 100 and cooling plates 201 and 202, which dissipate the heat conducted through the terminals of the storage cells via electrically insulating heat-conducting foils 203, 204, and 205.

On the front side of the storage cell module 100, a first heat-conducting foil 203 is affixed at its first side to terminals 111 through 120, and on the back side of the storage cell module a second heat-conducting foil 203 is affixed at its first side to terminals 121 through 130, preferably by gluing. In the present exemplary embodiment, the second side of each heat-conducting foil has a slide coating, in particular a PVDF or PTFE coating.

In addition to the first heat-conducting foils 203, in the direction of cooling plates 201 and 202, a second heat-conducting foil 204 is provided in each case, which is plastic or elastic under pressure. Connected thereto in each case, in the direction of the cooling plates, is a third heat-conducting foil 205, which essentially corresponds to the first heat-conducting foil. The third heat-conducting foil 205 is preferably composed of the same material as the first heat-conducting foil, but preferably is not provided with an adhesive layer.

The second heat-conducting foil 204 is preferably electrically insulating, and preferably compensates for production tolerances in the distance between the storage cell module 100 and the cooling plates 201 and 202 after the storage cell module is installed between the cooling plates.

As shown in FIG. 2, two storage cell modules 100 may be adjacently inserted between the cooling plates 201 and 202 and cooled. As indicated by the cooling wall 207 extending over the cooling plates, these cooling plates are followed by additional cooling plates between which (not explicitly illustrated) storage cell modules 100 are once again provided in the manner described. An additional cooling wall 207 (not illustrated) is provided in front of the storage cell module 100 illustrated in FIG. 2; i.e., every two storage cell modules are enclosed by an arrangement of two cooling plates and two cooling walls. It is understood that a larger or smaller number of modules may be provided between adjacent cooling plates.

To establish reliable thermal contact between the poles, i.e., terminals 111 through 120 and 121 through 130 of the storage cells, and the cooling plates 201 and 202, the cooling plates are provided with a plurality of thermally conductive spring elements 210; i.e., each spring element makes thermal (not electrical) contact with a pole, i.e., a terminal, of a storage cell via the electrically insulating system composed of the three heat-conducting foils 203, 204, and 205.

The cooling plates as well as the cooling walls are preferably made of aluminum or another metal, and preferably have cooling channels 206 through which a heat-dissipating medium is led into a heat exchanger. If practical, the cooling channels 206 may be omitted, and one or more cooling walls or cooling plates are provided with a Peltier cooling apparatus and cooled.

The apparatus 200 preferably has a removable housing cover (not illustrated). The housing cover has second electrical connectors (not illustrated), which connect the modules in series when the modules are covered by the housing cover, and which interrupt the series connection when the housing cover is removed. It is preferred that after the series connection is interrupted, i.e., the cover is lifted, no hazardous high contact voltage is present at any location on the apparatus according to the invention.

TABLE OF REFERENCE NUMBERALS

100 Storage cell module
101 through 110 Storage cells
111 through 120 Front terminals or poles of the storage cells
121 through 130 Back terminals or poles of the storage cells
140 through 145 Electrical connectors in the form of welded strips
150 Printed circuit board
160 through 165 Printed conductors or contact tabs
170 Electronic control device
180 Terminal post
190 Terminal post
191 Metal jacket
200 Apparatus for supplying power
201 Cooling plate
202 Cooling plate
203 First thermally conductive layer
204 Second thermally conductive layer
205 Third thermally conductive layer
210 Thermally conductive spring elements The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. An apparatus for supplying power to a motor vehicle, comprising:
   a plurality of storage units having electrodes, at least one of the electrodes in the storage units each having a metallic construction;
   a plurality of terminals arranged on a side of and outside of the storage units, a respective metallic electrode being connected in an electrically conductive manner to a respective terminal with a connecting element, wherein the plurality of terminals are electrically connected via electrical connectors such that the plurality of storage cells are connected in series;
   a thermally conductive cooling plate having a plurality of cooling channels through or around which a heat-dissipating medium flows, said cooling plate further having a plurality of thermally conductive spring elements thermally contacting the plurality of terminals and dissipating thermal energy supplied by the electrodes to the terminals via the connecting element; and
   an electrically insulating, thermally conductive layer that is layered in a plane separate from a plane of the cooling plate and is in physical contact with the cooling plate, wherein the thermally conductive layer further is between the plane of the cooling plate and the plurality of terminals thereby electrically insulating the cooling plate from the plurality of terminals, and wherein the thermally conductive layer extends across and is in physical contact with a top of the plurality of terminals via an adhesive layer.

2. The apparatus according to claim 1, wherein the metallic construction of the electrodes comprises one of metal electrodes and electrodes having a metal layer.

3. The apparatus according to claim 1, wherein the thermally conductive layer comprises one or more superposed heat-conducting foils formed of one of polyimide and thin PTFE, and has an overall thickness of approximately 0.05 mm.

4. The apparatus according to claim 3, wherein a first side of a heat-conducting foil is fixed to the top of the terminals, and a second side has a slide coating formed of one of a PVDF and a PTFE coating.

5. The apparatus according to claim 2, wherein a heat-conducting foil, which is plastically or elastically deformable under pressure, is provided between the terminals of the storage units and the cooling plate, and further wherein the heat-conducting foil is electrically insulating and compensates for or fills production tolerances in any gaps.

6. The apparatus according to claim 1, wherein the heat-dissipating medium is one of air, water, refrigerant R 134a, and carbon dioxide R 744.

7. The apparatus according to claim 2, wherein multiple cooling plates are consecutively positioned at a distance from one another, and multiple storage units are provided between covers of every two adjacent cooling plates.

8. The apparatus according to claim 7, wherein the storage units between two adjacent cooling plates are provided in the form of multiple modules of storage cells connected in series and are covered by a housing cover, in each case a maximum contact voltage of the modules being less than 60 volts.

9. The apparatus according to claim 7, wherein at least some of the lateral surfaces of the cooling plates are brought into essentially perpendicular contact with a first and a second cooling wall, which extends over multiple consecutively positioned storage units, the storage units being situated between the first and the second cooling wall.

10. The apparatus according to claim 9, wherein at least one of the first and second cooling wall is provided with cooling channels, which are connected to respective ones of the plurality of cooling channels in the cooling plates.

11. The apparatus according to claim 2, further comprising:
at least one printed circuit board containing printed conductors provided between the electrical connectors, the printed conductors electrically contacting connecting elements of each storage cell and tapping one of a voltage present at each of the storage units, a current flow, and another characteristic parameter of the storage units, and supplying same to a control device programmed to balance or compensate for the energy content of the storage units relative to one another in order to increase service life.

12. The apparatus according to claim 9, wherein the storage units, the cooling plates and optionally the cooling walls are enclosed by thermal insulation.

13. The apparatus according to claim 12, wherein one or more of the cooling plates and/or the cooling walls are provided with an electrically operated air conditioner device, which dissipates the thermal energy and operates according to the evaporative or Peltier process.

14. The apparatus according to claim 2, wherein the terminals of the storage units are provided either at both axial ends or adjacent to one another on one end.

15. The apparatus according to claim 8, wherein the storage units of a module, in each case, have one of a: circular, prismatic, rectangular, oval, and flattened oval cross section, or a flat-cell design in the form of a "coffee bag."

16. An apparatus for supplying power to a motor vehicle, comprising:
a plurality of storage units having electrodes, at least one of the electrodes in the storage units each having a metallic construction;
a plurality of terminals arranged on a side of and outside of the storage units, a respective metallic electrode being connected in an electrically conductive manner to a respective terminal with a connecting element, wherein the plurality of terminals are electrically connected via electrical connectors such that the plurality of storage cells are connected in series;
a thermally conductive cooling plate having a plurality of cooling channels through and around which a heat-dissipating medium flows, said cooling plate further having a plurality of thermally conductive spring elements thermally contacting the plurality of terminals and dissipating thermal energy supplied by the electrodes to the terminals via the connecting element;
an electrically insulating, thermally conductive layer that is layered in a plane separate from a plane of the cooling plate and is in physical contact with the cooling plate, wherein the thermally conductive layer further is between the plane of the cooling plate and the plurality of terminals thereby electrically insulating the cooling plate from the plurality of terminals, and wherein the thermally conductive layer extends across and is in physical contact with a top of the plurality of terminals via an adhesive layer;
at least one printed circuit board containing printed conductors provided between the terminals, the printed conductors electrically contacting the terminals of each storage unit and tapping one of a voltage present at each of the storage units, a current flow, and another characteristic parameter of the storage unit; and
a control device which receives said one of the voltage, current flow, and another characteristic parameter supplied from the printed circuit board, the control device programmed to balance or compensate for energy content of the storage units relative to one another whereby service life is increased.

17. The apparatus according to claim 16, wherein the metallic construction of the electrodes comprises one of metal electrodes and electrodes having a metal layer.

18. The apparatus according to claim 16, wherein multiple cooling plates are consecutively positioned at a distance from one another, and multiple storage units are provided between covers of every two adjacent cooling plates.

19. The apparatus according to claim 18, wherein at least some of the lateral surfaces of the cooling plates are brought into essentially perpendicular contact with a first and a second cooling wall, which extends over multiple consecutively positioned storage units, the storage units being situated between the first and the second cooling wall.

* * * * *